US012515918B2

(12) United States Patent
Roussel et al.

(10) Patent No.: US 12,515,918 B2
(45) Date of Patent: Jan. 6, 2026

(54) CONTROLLER FOR CONTROLLING AN ELEVATOR SYSTEM IN AN INSPECTION MODE, AND ELEVATOR SYSTEM

(71) Applicant: Inventio AG, Hergiswil (CH)

(72) Inventors: Frank Olivier Roussel, Lucerne (CH); Markus Walker, Ziefen (CH)

(73) Assignee: INVENTIO AG, Hergiswil (CH)

( * ) Notice: Subject to any disclaimer, the term of this patent is extended or adjusted under 35 U.S.C. 154(b) by 870 days.

(21) Appl. No.: 17/757,238

(22) PCT Filed: Nov. 30, 2020

(86) PCT No.: PCT/EP2020/083859

§ 371 (c)(1),
(2) Date: Jun. 13, 2022

(87) PCT Pub. No.: WO2021/121920

PCT Pub. Date: Jun. 24, 2021

(65) Prior Publication Data

US 2023/0002192 A1 Jan. 5, 2023

(30) Foreign Application Priority Data

Dec. 19, 2019 (EP) .................................... 19218216

(51) Int. Cl.
*B66B 5/00* (2006.01)

(52) U.S. Cl.
CPC ............ *B66B 5/0087* (2013.01); *B66B 5/005* (2013.01)

(58) Field of Classification Search
CPC .............................. B66B 5/0087; B66B 5/005
USPC .......................................................... 187/289
See application file for complete search history.

(56) References Cited

U.S. PATENT DOCUMENTS

2018/0319623 A1* 11/2018 Prakash .................... B66B 5/18

FOREIGN PATENT DOCUMENTS

| | | | | | |
|---|---|---|---|---|---|
| CA | 2709856 | C * | 7/2016 | ............. | B66B 13/22 |
| CN | 1035475 | A | 9/1989 | | |
| CN | 1423385 | A | 6/2003 | | |
| CN | 101472830 | A | 7/2009 | | |
| CN | 101670967 | A | 3/2010 | | |
| CN | 103201205 | A | 7/2013 | | |
| CN | 107108152 | A | 8/2017 | | |
| EP | 2033927 | A1 | 3/2009 | | |
| EP | 2493802 | B1 | 4/2014 | | |
| JP | H1179593 | A | 3/1999 | | |

* cited by examiner

*Primary Examiner* — Kawing Chan
(74) *Attorney, Agent, or Firm* — Shumaker, Loop & Kendrick, LLP

(57) ABSTRACT

A control device controls an elevator system in inspection mode, the elevator system having a safety circuit with at least one safety contact that is open in inspection mode and an inspection path for bridging the safety contact. The control device includes first and second operating elements for controlling the inspection mode and first and second switching units connected in parallel and each having a contact associated with a delay means. The switching units close and open their contacts in response to actuation and release of the first and second operating elements respectively. The contacts are series connected in the inspection path. The first and second delay means delay opening of the associated contacts by defined delay times after the release of the first and operating element respectively.

14 Claims, 8 Drawing Sheets

CONTROLLER FOR CONTROLLING AN ELEVATOR SYSTEM IN AN INSPECTION MODE, AND ELEVATOR SYSTEM

FIELD

The present invention relates to a control device for controlling an elevator system in inspection mode. The invention further relates to an elevator system having such a control device.

BACKGROUND

Elevators such as passenger or freight elevators are usually equipped with a safety circuit. Such a safety circuit typically comprises a series connection of safety-relevant switches, at least one of which can be opened under certain operating conditions, for example when the elevator is put into inspection mode, a fault is detected or a car door, shaft door, maintenance door or maintenance hatch is opened. If the safety circuit is interrupted, the elevator is brought to a standstill by a drive of the elevator being switched off and a braking device for braking the elevator being activated. For example, as door switches, the switches monitor the closing states of elevator doors, i.e., a car door and a plurality of shaft doors, so that it can be ensured that an elevator car can only be moved when all the elevator doors are closed and assigned door switches are thus actuated.

When the elevator is in inspection mode, for example for repair or maintenance purposes, the safety circuit is usually interrupted, for example because a corresponding switch in the safety circuit was opened by putting the elevator into inspection mode or a shaft door had to be opened so that a technician could enter an elevator shaft through the shaft door. In order to still be able to operate the elevator, open contacts of the safety circuit can be closed via an inspection path. The inspection path can be closed via a multi-button inspection control means. In order to move the elevator in inspection mode, for example, a first operating button for enabling a travel movement and a second operating button for specifying a travel direction must be pressed simultaneously. If one of the operating buttons is released, the inspection path, and thus the safety circuit, is immediately interrupted again, which results in immediate activation of the braking device and relatively abrupt braking of the elevator. As a result, forces which place a heavy load on the load-bearing elements of the elevator can occur. The forces can cause vibrations which affect the maintenance personnel and their processes, such as the precise positioning of the car.

A safety circuit in an elevator system is described in EP 2 493 802 B1. The safety circuit comprises at least one series connection of safety-relevant contacts which are closed during interference-free operation of the elevator system. At least one of the contacts can be bridged by means of semiconductor switches, the semiconductor switches being able to be controlled by means of at least one processor and being able to be monitored for short circuits by means of at least one monitoring circuit. Furthermore, the safety circuit comprises at least one electromechanical relay circuit having relay contacts connected in series with the contacts of the bridgeable series circuit. The relay circuit can be controlled by means of the processor. The bridgeable series circuit can be interrupted by means of the relay contacts in the event of a short circuit in the semiconductor switches.

SUMMARY

An object of the invention is that of improving the braking behavior of an elevator when opening a safety circuit of the elevator, in particular during an inspection. The prior art deals with safely interrupting the bridging path because the car is moving into an unsafe condition. The aim of the invention is that of stopping a car movement in inspection mode. There is no urgency here.

The stated object is achieved by way of a control device and an elevator system according to the advantageous embodiments that are defined in the following description.

A first aspect of the invention relates to a control device for controlling an elevator system in inspection mode. The elevator system comprises a safety circuit having at least one safety contact, which is open in inspection mode, and an inspection path for bridging the at least one safety contact. The control device comprises a first operating element for operating the elevator system in inspection mode, a second operating element for operating the elevator system in inspection mode, and a first switching unit which has a first contact and a first delay means and is designed to close the first contact in response to an actuation of the first operating element and to open the first contact in response to a release of the first operating element. The first delay means is designed to delay opening of the first contact by a defined first delay time after the release of the first operating element. The control device further comprises a second switching unit which is connected in parallel with the first switching unit, has a second contact and a second delay means and is designed to close the second contact in response to an actuation of the second operating element and to open the second contact in response to a release of the second operating element. The second delay means is designed to delay opening of the second contact by a defined second delay time after the release of the second operating element. The first contact and the second contact are connected in series in the inspection path.

Such a control device makes it possible to activate a braking device of the elevator system with a time delay for releasing at least one of the two operating buttons of the inspection control means. This delay can be used to stop the elevator system in a controlled manner by controlling a drive of the elevator system before the elevator system is braked mechanically by the braking device. As a result, the load on load-bearing elements of the elevator system can be reduced. Wear of brake disks and brake pads of the braking device can also be reduced. A further advantage is the increased comfort for the maintenance personnel, in particular when the maintenance personnel are on a car roof when the elevator system is being moved.

A safety circuit can be understood to mean a circuit of the elevator system that includes a series connection between a plurality of safety-relevant contacts. These safety contacts can be closed during normal mode so that the entire safety circuit is closed and thus, in particular, the elevator car can be moved. Under certain operating conditions, for example in the event of a fault or when the elevator system is put into inspection mode, at least one of the safety switches and thus the entire safety circuit can be opened, causing the elevator system to be shut down. In particular, emergency braking of the elevator system can be initiated when the safety circuit is interrupted.

An inspection path can be understood as a current path parallel to the series connection of the safety contacts. The inspection path can have a series connection between at least two switching contacts. The safety contacts can be bridged by closing all contacts in the inspection path.

An operating element can generally be understood as a switch which is actuated by being touched or pressed by a finger or a hand and automatically returns to a rest position when the finger or hand is removed or when it is released. For example, the operating element can be a mechanical knob or button or a sensor button, such as a capacitive button or a Hall effect button.

The first operating element and the second operating element can each be coupled to a programmable elevator control means of the elevator system. The elevator control means can be configured to detect a current switching state of the operating elements in each case and, depending on the switching state, to actuate a power converter of the elevator system.

For example, the first operating element can be a switch for enabling a travel movement of the elevator system and the second operating element can be a switch for specifying a direction of the travel movement.

The first switching unit and the second switching unit can, for example, be constructed in the same way. The two switching units can comprise electromechanical and/or electronic components. In particular, the two switching units can be implemented entirely in hardware, for example in the form of electromechanical relays. As a result, the amount of testing required before an elevator system equipped with such a control device is put into operation can be reduced. However, it is also possible for at least one of the two switching units to be designed as a programmable electronic module, in particular as a PESSRAL module (PESSRAL=Programmable Electronic System in Safety Related Applications for Lifts), or as a component of such an electronics module.

Each of the contacts of the two switching units can be mechanical contacts or semiconductor contacts.

In the simplest case, the two delay means can each be an additional capacitor for storing the electrical energy required to actuate the associated contacts. For example, the capacitor can be connected to the associated contacts in such a way that when the capacitor is discharged, the associated contacts can no longer be actuated either. Alternatively, the delay means can each be a (programmable) hardware or software module coupled to a suitable timer.

The first delay time and the second delay time can be the same or different.

A second aspect of the invention relates to an elevator system which comprises a safety circuit having at least one safety contact which is open when the elevator system is in inspection mode, an inspection path for bridging the at least one safety contact, and a control device as described above and below.

Possible features and advantages of embodiments of the invention can be considered, inter alia and without limiting the invention, to be based upon the concepts and findings described below.

According to an embodiment, the elevator system has at least one elevator car, a drive for driving the at least one elevator car, a power converter for controlling a power supply of the drive and a braking device for braking the at least one elevator car, which braking device can be activated by interrupting the safety circuit. The first delay time and the second delay time can each be selected such that the at least one elevator car can be stopped by controlling the power supply to the drive before the braking device is activated.

For example, the elevator control means can be configured to actuate the power converter as an immediate reaction to the release of at least one of the two operating elements in such a way that the drive is stopped. Accordingly, each of the delay times should not be shorter than the minimum time that the power converter needs to control the drive down to a standstill. Alternatively, the delay times can be selected in such a way that the at least one elevator car is not braked to a standstill, but rather is at least braked to a very low speed before the braking device is activated.

A braking device can be understood to mean a mechanical, for example electrically actuable, machine brake or a brake on the elevator car.

According to an embodiment, the first delay time and the second delay time are each greater than 10 ms. The delay times can each also be significantly greater than 10 ms, for example greater than 20 ms, greater than 50 ms, greater than 100 ms, greater than 500 ms, greater than 1 s, greater than 1.5 s and/or up to 2 s.

According to an embodiment, the control device can also have a third switching unit which is connected in parallel with the first switching unit and the second switching unit. The third switching unit can have a third contact and a third delay means and can be designed to close the third contact in response to the actuation of the first operating element and/or the second operating element and to open the third contact in response to the release of the first operating element and the second operating element. The third delay means can be designed to delay closing of the third contact by a defined third delay time after the actuation of the first operating element and/or the second operating element. The third contact can be connected in series with the first contact and the second contact in the inspection path.

As a result, the inspection path is always closed with a delay of a certain time, regardless of how small the time interval is between the actuation of the first operating element and the actuation of the second operating element. For example, if the third delay time is longer than the time interval between the actuation of the first operating element and the actuation of the second operating element, the inspection path can remain interrupted for a certain time, although both operating elements have already been actuated. A switch-on delay can thus be carried out.

According to an embodiment, the third switching unit can be designed to prevent at least one of the three contacts in the inspection path from closing in the event of a fault in the third switching unit.

This can prevent the inspection path from being able to be closed without a switch-on delay.

According to an embodiment, the first switching unit can have a first control terminal and can be designed to close the first contact when a control signal is present at the first control terminal and to open the first contact when a control signal is not present at the first control terminal. The first operating element can be designed to connect the first control terminal to a signal source for providing the control signal in an actuated position and to disconnect the first control terminal from the signal source in a rest position. Accordingly, the first delay means can be designed to delay drop-out of the control signal at the first control terminal by the first delay time when the first control terminal is disconnected from the signal source.

A control signal can be understood to mean, for example, a current signal or a voltage signal. Accordingly, the signal source can be understood as an electrical energy source in the form of a power source or voltage source.

The first control terminal can be, for example, a coil terminal of a relay or a gate or base terminal of a transistor.

According to an embodiment, the second switching unit can have a second control terminal and can be designed to close the second contact when a control signal is present at the second control terminal and to open the second contact when a control signal is not present at the second control terminal. The second operating element can be designed to connect the second control terminal to a signal source for providing the control signal in an actuated position and to disconnect the first control terminal from the signal source in a rest position. Accordingly, the second delay means can be designed to delay drop-out of the control signal at the second control terminal by the second delay time when the second control terminal is disconnected from the signal source.

The second control terminal can be, for example, a coil terminal of a relay or a gate or base terminal of a transistor.

According to an embodiment, the first switching unit can have a fourth contact and can be designed to open the fourth contact when the control signal is present at the first control terminal and to close the fourth contact when a control signal is not present at the first control terminal. The second switching unit can have a fifth contact and can be designed to open the fifth contact when the control signal is present at the second control terminal and to close the fifth contact when a control signal is not present at the second control terminal. The third switching unit can also have a third control terminal and can be designed to open the third contact when a control signal is present at the third control terminal and to close the third contact when a control signal is not present at the third control terminal. Accordingly, the third delay means can be designed to delay drop-out of the control signal at the third control terminal by the third delay time when the third control terminal is disconnected from a signal source for providing the control signal. The third control terminal can be connected to the signal source via the fourth contact and the fifth contact. The fourth contact and the fifth contact can be connected in series.

For example, the third delay means can comprise a capacitor which can provide electrical energy for actuating the third contact (or additional contacts) of the third switching unit. The third switching unit can be disconnected from the signal source by opening the fourth contact or the fifth contact so that the third switching unit is only supplied with electrical energy via the capacitor. A capacitance of the capacitor determines the third delay time. The third contact in the inspection path only closes when the capacitor is discharged. In other words, the two operating elements must be held simultaneously in their respective actuation positions for at least the duration of the third delay time in order for the inspection path to close.

According to an embodiment, the first switching unit can have a sixth contact and can be designed to close the sixth contact when the control signal is present at the first control terminal and to open the sixth contact when a control signal is not present at the first control terminal. The third switching unit can also have a seventh contact and can be designed to close the seventh contact when the control signal is present at the third control terminal and to open the seventh contact when a control signal is not present at the third control terminal. The sixth contact can be connected between the first operating element and the first control terminal. The seventh contact can be arranged in a bridging path which bridges the sixth contact.

In other words, the first control terminal can only be connected to the signal source via the first operating element if the bridging path is closed. This is the case when the seventh contact is closed by the third switching unit. If the seventh contact cannot be closed for any reason, the first contact, which can be actuated via the first control terminal, can no longer be actuated, i.e., closed, either.

The first contact, the fourth contact and the sixth contact can, for example, be forcibly guided. In this case, the first switching unit can assume exactly two switching states. In a first switching state, the first contact and the sixth contact are open, while the fourth contact is closed. In a second switching state, the first contact and the sixth contact are closed, while the fourth contact is closed.

According to an embodiment, the second switching unit can have an eighth contact and can be designed to close the eighth contact when the control signal is present at the second control terminal and to open the eighth contact when a control signal is not present at the second control terminal. The third switching unit can have a ninth contact and can be designed to close the ninth contact when the control signal is present at the second control terminal and to open the ninth contact when a control signal is not present at the third control terminal. The eighth contact can be connected between the second operating element and the second control terminal. The ninth contact can be arranged in a bridging path which bridges the eighth contact.

In other words, the second control terminal can only be connected to the signal source via the second operating element if the bridging path which bridges the eighth contact is closed. This is the case when the ninth contact is closed by the third switching unit. If the ninth contact cannot be closed for any reason, the second contact, which can be actuated via the second control terminal, can no longer be actuated, i.e., closed, either.

The second contact, the fifth contact and the eighth contact can, for example, be forcibly guided. In this case, the second switching unit can assume exactly two switching states. In a first switching state, the second contact and the eighth contact are open, while the fifth contact is closed. In a second switching state, the second contact and the eighth contact are closed, while the fifth contact is open.

Additionally or alternatively, for example, the third contact, the seventh contact and the ninth contact can be forcibly guided. In this case, the third switching unit can assume exactly two switching states. In a first switching state, the third contact is open, while the seventh contact and the ninth contact are closed. In a second switching state, the third contact is closed, while the seventh contact and the ninth contact are open.

According to an embodiment, the first switching unit can be designed as a first electromechanical relay. Additionally or alternatively, the second switching unit can be designed as a second electromechanical relay. Additionally or alternatively, the third switching unit can be designed as a third electromechanical relay.

Such a relay can comprise a coil and an actuator electromagnetically coupled to the coil, for example in the form of a hinged armature or tie rod, the actuator being attracted when the coil is switched on and being moved back to a rest position, for example by means of spring force, when the coil is turned off. The actuator can be mechanically coupled to one or more contacts of the relay. If the relay comprises a plurality of contacts, the contacts can be forcibly guided via the actuator. This can prevent an NC contact (normally closed) and an NO contact (normally open) of the relay from being closed or opened at the same time, for example. A high degree of robustness of the control device can be achieved by means of this embodiment. In addition, the control device can be produced with relatively little complexity.

According to an embodiment, the first delay means can comprise a capacitor which is connected in parallel with a coil of the first relay. Additionally or alternatively, the second delay means can comprise a capacitor which is connected in parallel with a coil of the second relay. Additionally or alternatively, the third delay means can comprise a capacitor which is connected in parallel with a coil of the third relay.

Each capacitance of the capacitors can be selected depending on the delay time to be achieved in each case. For example, the control device may be designed to connect the capacitor of the first relay to a power source in response to the actuation of the first operating element in order to charge the capacitor, and to disconnect both the capacitor and the coil of the first relay from the power source in response to the release of the first operating element. This ensures that the coil is supplied with electrical energy exclusively via the capacitor as soon as the first operating element is released. This can also apply analogously to the second relay.

Embodiments of the invention will be described below with reference to the attached drawings; neither the drawings nor the description should be interpreted as limiting to the invention.

DESCRIPTION OF THE DRAWINGS

FIG. 3 shows the control device from FIG. 1 when switched on.

The drawings are merely schematic and not to scale. Like reference signs denote like or equivalent features in the various drawings.

DETAILED DESCRIPTION

Figure 1:
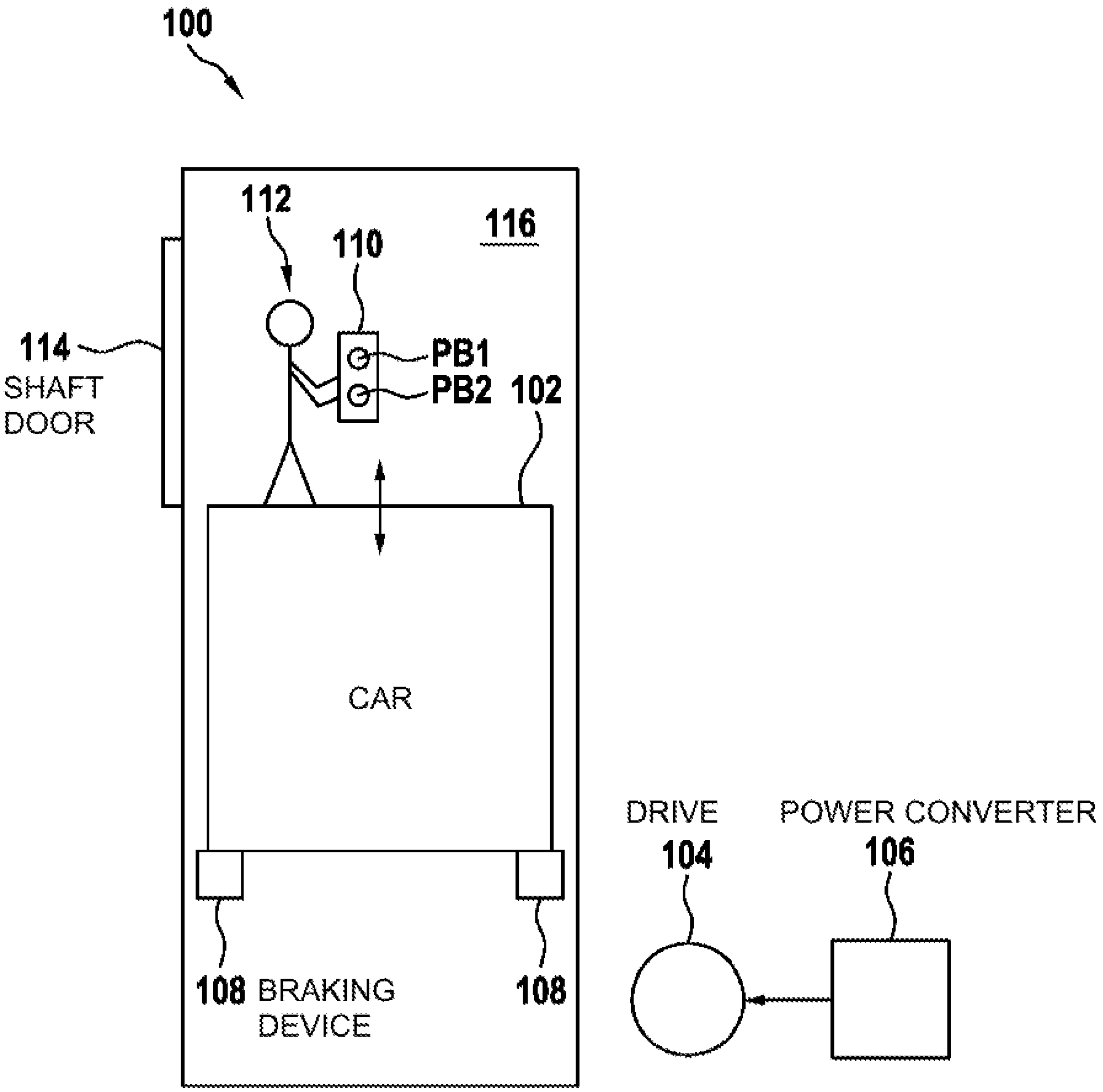
FIG. 1 shows an example of an embodiment of an elevator system incorporating the invention.

By way of example, FIG. 1 shows an elevator system 100 having an elevator car 102 which can be moved up and down by means of a drive 104. The drive 104 is supplied with power via a power converter 106, for example a frequency converter. Furthermore, the elevator system 100 has a braking device 108 which is used to brake the elevator car 102 mechanically to a standstill in the event of a fault or under certain operating conditions which deviate from normal mode and to keep the elevator car at a standstill.

In order to be able to move the elevator car 102 in inspection mode of the elevator system 100, the elevator system 100 has an inspection control means 110. An operator 112 can switch the elevator system 100 to inspection mode by means of the inspection control means 110. In the process, or also when a shaft door 114 is opened through which the operator 112 gains access to an elevator shaft 116 of the elevator system 100, a safety circuit of the elevator system 100, and thus the power supply of the drive 104, is interrupted. When the safety circuit is interrupted, the braking device 108 is also activated.

The inspection control means 110 comprises a first operating element PB1 for enabling a travel movement and a second operating element PB2 for specifying a direction of the travel movement, i.e., up or down. The first operating element PB1 and the second operating element PB2 must be held in their respective operating positions by the operator 112 at the same time so that the elevator car 102 moves up or down.

Figure 2:
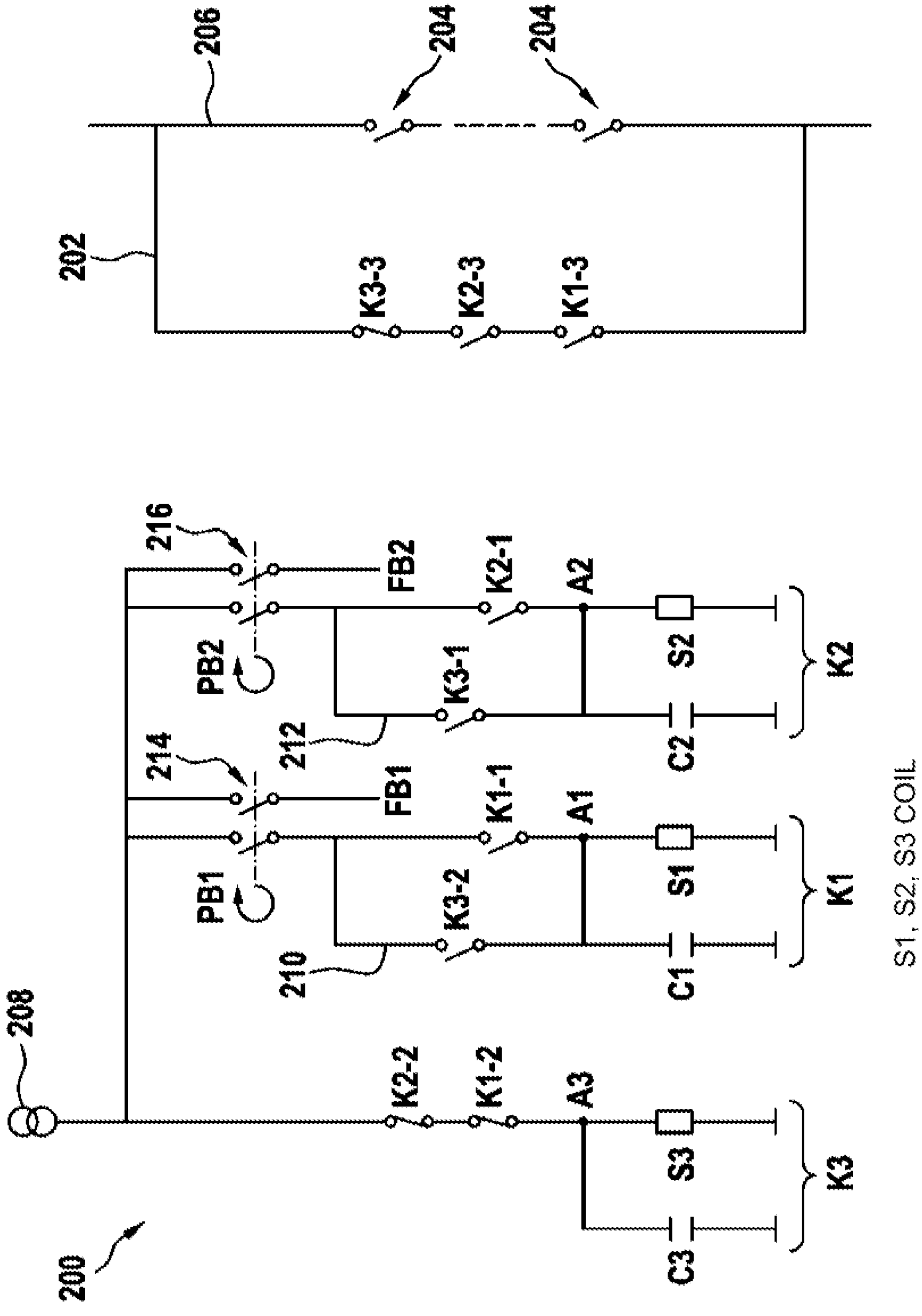
FIG. 2 shows a control device from FIG. 1 when switched off.

FIG. 2 shows a control device 200 which comprises the two operating elements PB1, PB2 from FIG. 1. The control device 200 is designed to close an inspection path 202 when the two operating elements PB1, PB2 are actuated accordingly and to interrupt the inspection path when at least one of the two operating elements PB1, PB2 is released. The inspection path 202 is connected in parallel with a series connection of safety contacts 204 in the safety circuit 206 mentioned in connection with FIG. 1. At least one of the safety contacts 204 is open in inspection mode. The functioning of the control device 200 is explained in more detail below.

The control device 200 comprises a first switching unit K1, a second switching unit K2, and a third switching unit K3 which are connected in parallel with one another. Each of the three switching units K1, K2, K3 is designed having three contacts, of which two contacts act as NO contacts and one contact acts as an NC contact. These contacts can be designed as mechanical contacts or as semiconductor contacts. A switching logic of the control device 200 is illustrated below using the example of three electromechanical relays. However, the switching logic can just as well be provided by an electronic system which can be programmable, for example. In order to be able to ensure the safety of the elevator system, the relays or the electronic system can be constructed using suitable electrical and/or electronic components in such a way that they correspond to a high safety standard, for example the SIL3 standard (Safety Integrity Level).

The first switching unit K1 has a first coil S1 and three contacts K1-1, K1-2 and K1-3 which can be opened and closed by means of the first coil S1. Contacts K1-1, K1-3 are each designed as NO contacts, while contact K1-2 is designed as an NC contact. In addition, the first switching unit K1 has a first delay means C1 (here a first capacitor C1) which is connected in parallel with the first coil S1.

The second switching unit K2 has a second coil S2 and three contacts K2-1, K2-2 and K2 3 which can be opened and closed by means of the second coil S2. Contacts K2-1, K2-3 are each designed as NO contacts, while contact K2-2 is designed as an NC contact. In addition, the second switching unit K2 has a second delay means C2 (here a second capacitor C2) which is connected in parallel with the second coil S2.

The third switching unit K3 has a third coil S3 and three contacts K3-1, K3-2 and K3-3 which can be opened and closed by means of the third coil S3. Contacts K3-1, K3-2 are each designed as NO contacts, while contact K3-3 is designed as an NC contact. In addition, the third switching unit K3 has a third delay means C3 (here a third capacitor C3) which is connected in parallel with the third coil S3.

K3 and C3 are provided to ensure that K1-3 and K2-3 are only closed if PB1 and PB2 are pressed within a time period determined by the dimensioning of C3.

The three delay means C1, C2, C3 can also be designed in other ways, for example as an RC element or diode or as a software module.

The three contacts K1-3, K2-3, K3-3 are connected in series in the inspection path 202. If all three contacts K1-3, K2-3, K3-3 are closed, the open safety contacts 204 in the safety circuit 206 are bridged. The remaining contacts of control device 200 are connected as follows.

The first coil S1 has a first control terminal A1 (here a first coil terminal A1) which can be connected via the first operating element PB1 to an energy source 208 for providing electrical energy (here a power source). The first operating element PB1 is connected in series with the first coil S1. In addition, the contact K1-1 is connected between the first operating element PB1 and the first coil terminal A1. The contact K3-2 is connected in parallel with the contact K1-1. The contact K3-2 is located in a first bridging path 210 which connects the first coil terminal A1 to a line portion connecting the contact K1-1 to the first operating element PB1. The first capacitor C1 is also connected to the first coil terminal A1 so that the first capacitor C1 is charged when the first coil terminal A1 is connected to the energy source 208, and the first coil S1 is supplied with power for a limited period depending on the capacitance and state of charge when the first coil terminal A1 is disconnected from the energy source 208.

Analogously, the second coil S2 has a second control terminal A2 which can be connected via the second operating element PB2 to an energy source 208. The second operating element PB2 is connected in series with the second coil S2. In addition, the contact K2-1 is connected between the second operating element PB2 and the second coil terminal A2. The contact K3-1 is connected in parallel with the contact K2-1. The contact K3-1 is located in a second bridging path 212 which connects the second coil terminal A2 to a line portion connecting the contact K2-1 to the second operating element PB2. The second capacitor C2 is also connected to the second coil terminal A2 so that the second capacitor C2 is charged when the second coil terminal A2 is connected to the energy source 208, and the second coil S2 is supplied with power depending on the capacitance and state of charge when the second coil terminal A2 is disconnected from the energy source 208.

In contrast, a third coil terminal A3 of the third coil S3 can be connected to the energy source 208 via the two contacts K1-2, K2-2, the two contacts K1-2, K2-2 being connected in series with one another. Thus, the third coil terminal A3 is disconnected from the energy source 208 as soon as one of the two contacts K1-2, K2-2 is opened, and is only supplied with power by the energy source 208 when both contacts K1-2, K2-2 are closed. The third capacitor C3 is also connected to the third coil terminal A3 so that the third capacitor C3 is charged when the third coil terminal A3 is connected to the energy source 208, and the third coil S3 is supplied with power depending on the capacitance and state of charge when the third coil terminal A3 is disconnected from the energy source 208.

In addition, the control device 200 has a first feedback path FB1 having a first feedback contact 214, and a second feedback path FB2 having a second feedback contact 216. The two feedback paths FB1, FB2 can, for example, be connected to a programmable elevator control means of the elevator system 100. The first feedback contact 214 is forcibly guided to the first operating element PB1 so that the first feedback contact 214 is closed as soon as the operator 112 actuates the first operating element PB1, and is opened again as soon as the operator 112 releases the first operating element PB1 again. Similarly, the second feedback contact 216 is forcibly guided to the second operating element PB2.

By closing or opening the two feedback paths FB1, FB2 in this way, the elevator control means can be informed directly about a current switching state of each of the two operating elements PB1, PB2 and can actuate the power converter 106 correspondingly.

FIG. 2 shows the control device 200 in a switched-off state in which the control device 200 is disconnected from the energy source 208, the three capacitors C1, C2, C3 are discharged and the two operating elements PB1, PB2 are each in a rest position. Accordingly, the contacts K1-1, K1-3, K2-1, K2-3, K3-1, K3-2, designed as NO contacts, are open and the contacts K1-2, K2-2, K3-3, designed as NC contacts, are closed.

Figure 3:
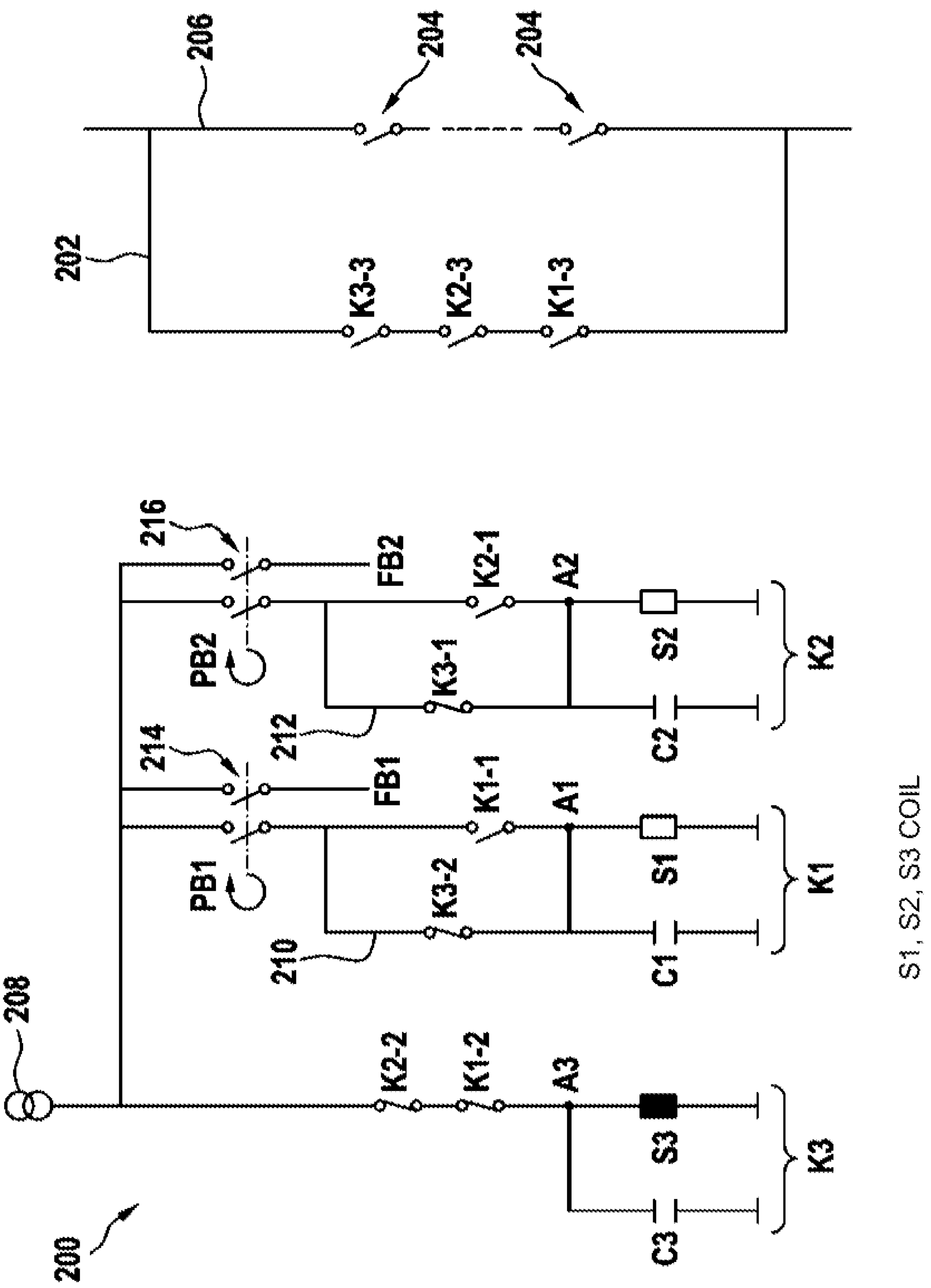

FIG. 3 shows the control device 200 in a switched-on state in which the control device 200 is connected to the energy source 208, in contrast to FIG. 2. The third coil terminal A3 is supplied with power via the two closed contacts K1-2, K2-2 so that the third capacitor C3 is charged and the third coil S3 is energized. As a result, the contact K3-2 in the first bridging path 210 and the contact K3-1 in the second bridging path 212 are closed, while the contact K3-3 in the inspection path 202 is opened. The two operating elements PB1, PB2 are still in their respective rest positions so that both the first coil terminal A1 and the second coil terminal A2 are disconnected from the energy source 208.

Figure 4:
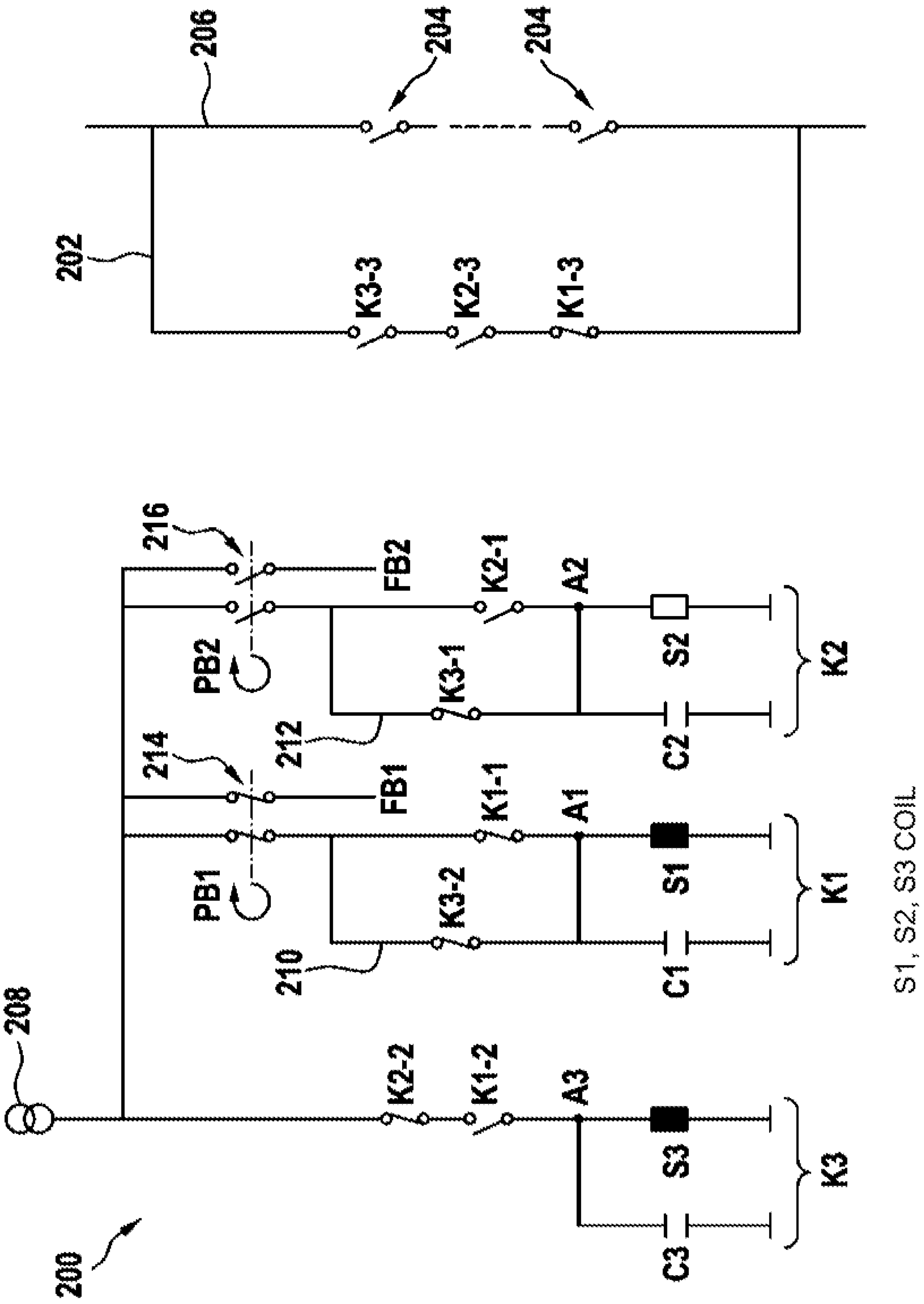
FIG. 4 shows the control device from FIG. 1 when a first operating element is actuated.

If the first operating element PB1 is now actuated, as shown in FIG. 4, a current flows to the first coil terminal A1 via the closed first bridging path 210 so that the first capacitor C1 is charged and the first coil S1 is energized. As a result, the contact K1-1 between the first coil terminal A1 and the first operating element PB1 and the contact K1-3 in the inspection path 202 are closed, while the contact K1-2 between the third coil terminal A3 and the energy source 208 is opened. The third coil terminal A3 is thus disconnected from the energy source 208. The power supply to the third coil S3 is maintained for a limited period via the third capacitor C3, which has been charged in the meantime. As long as the third coil S3 is supplied with power, the contact K3-3 located in the inspection path 202 also remains open.

If, for example, the third switching unit K3 is blocked for some reason and therefore the contacts K3-1, K3-2, K3-3 remain in the rest position although a current is flowing through the third coil S3, the two control terminals A1, A2 can no longer be connected to the energy source 208. This ensures that if there is a fault in the third switching unit K3, the two switching units K1, K2 remain in their respective rest positions despite actuation of each of the operating elements PB1, PB2, and the inspection path 202 is therefore not closed.

Figure 5:
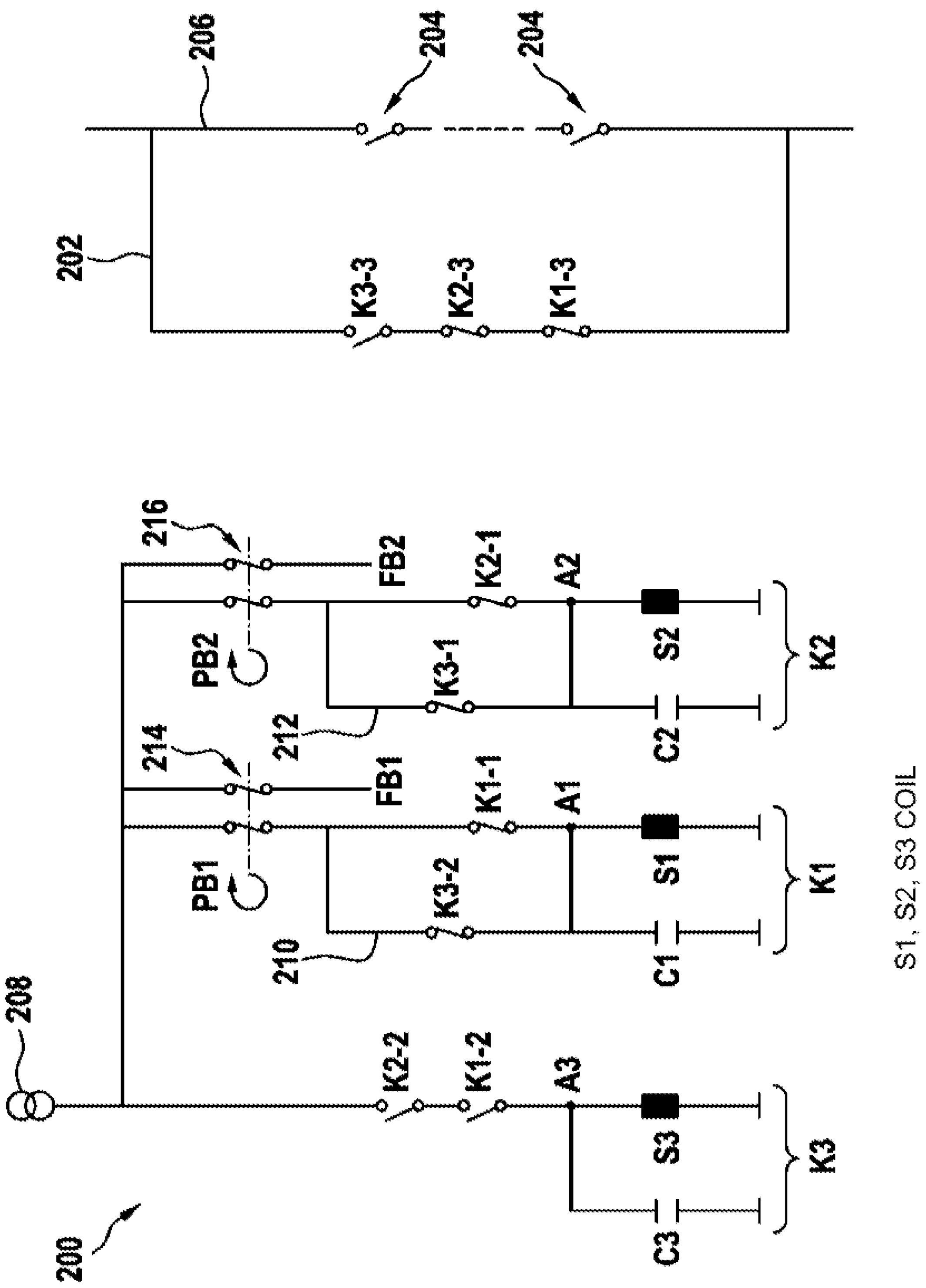
FIG. 5 shows the control device from FIG. 1 when a second operating element is actuated.

FIG. 5 shows a switching state of the control device 200 when the second operating element PB2 is actuated in addition to the first operating element PB1. In this case, analogously to the first switching unit K1, a current flows to the second coil terminal A2 via the closed second bridging path 212 so that the second capacitor C2 is charged and the second coil S2 is energized. As a result, the contact K2-1 between the second coil terminal A2 and the second operating element PB2 and the contact K2-3 in the inspection path 202 are closed, while the contact K2-2 between the third coil terminal A3 and the energy source 208 is opened. At the time when the second operating element PB2 is actuated here, the third coil S3 is still supplied with sufficient power via the third capacitor C3 so that the contact K3-3 located in the inspection path 202 is still open and the contacts K3-1, K3-2 are still closed.

Figure 6:
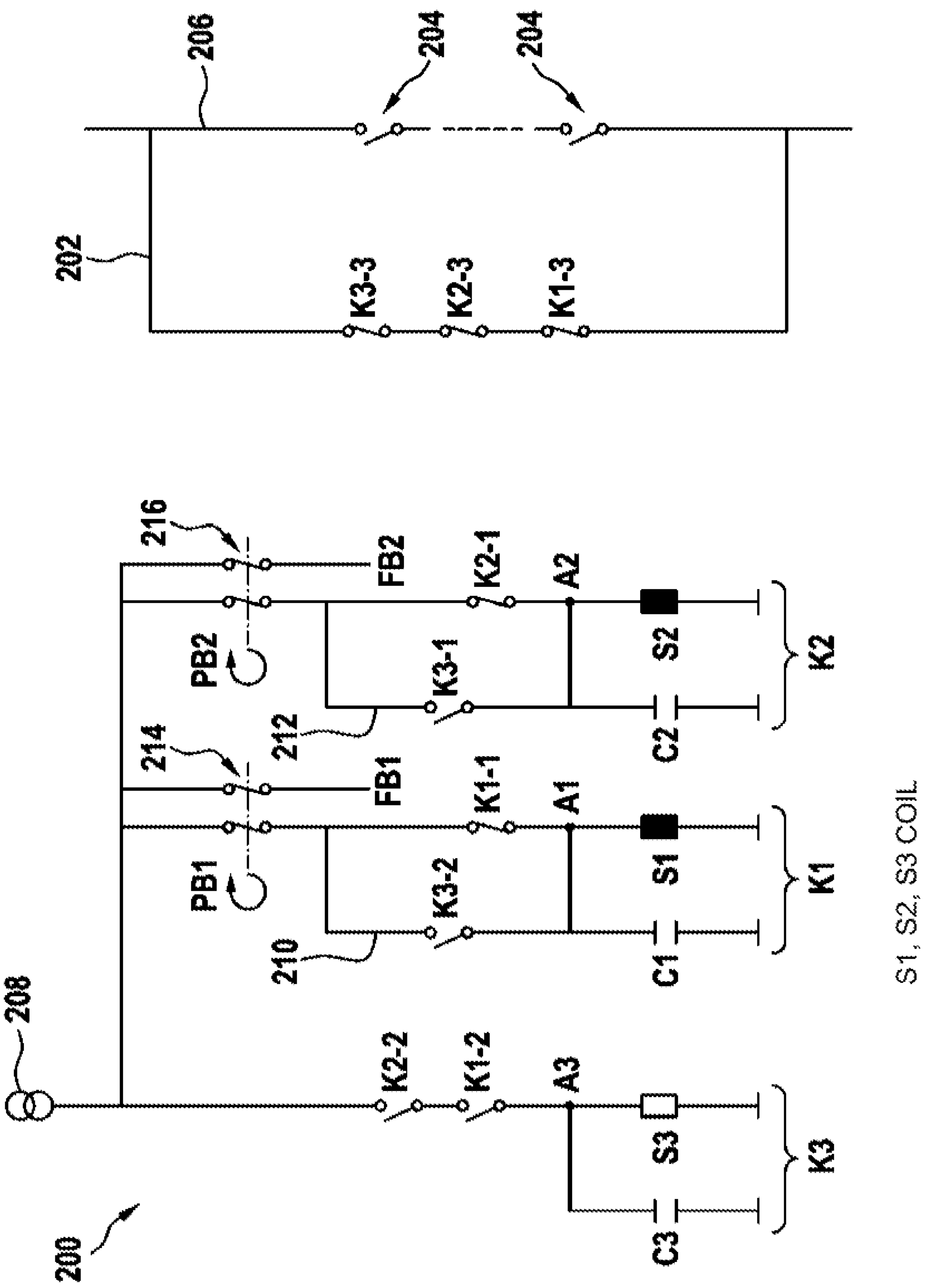
FIG. 6 shows the control device from FIG. 1 shortly after the first operating element and the second operating element have been actuated.

As soon as the third capacitor C3 is discharged, the third coil S3 drops out and the contact K3-3, and thus the inspection path 202, is closed. At the same time, contacts K3-1, K3-2 are opened. This is shown in FIG. 6.

Figure 7:
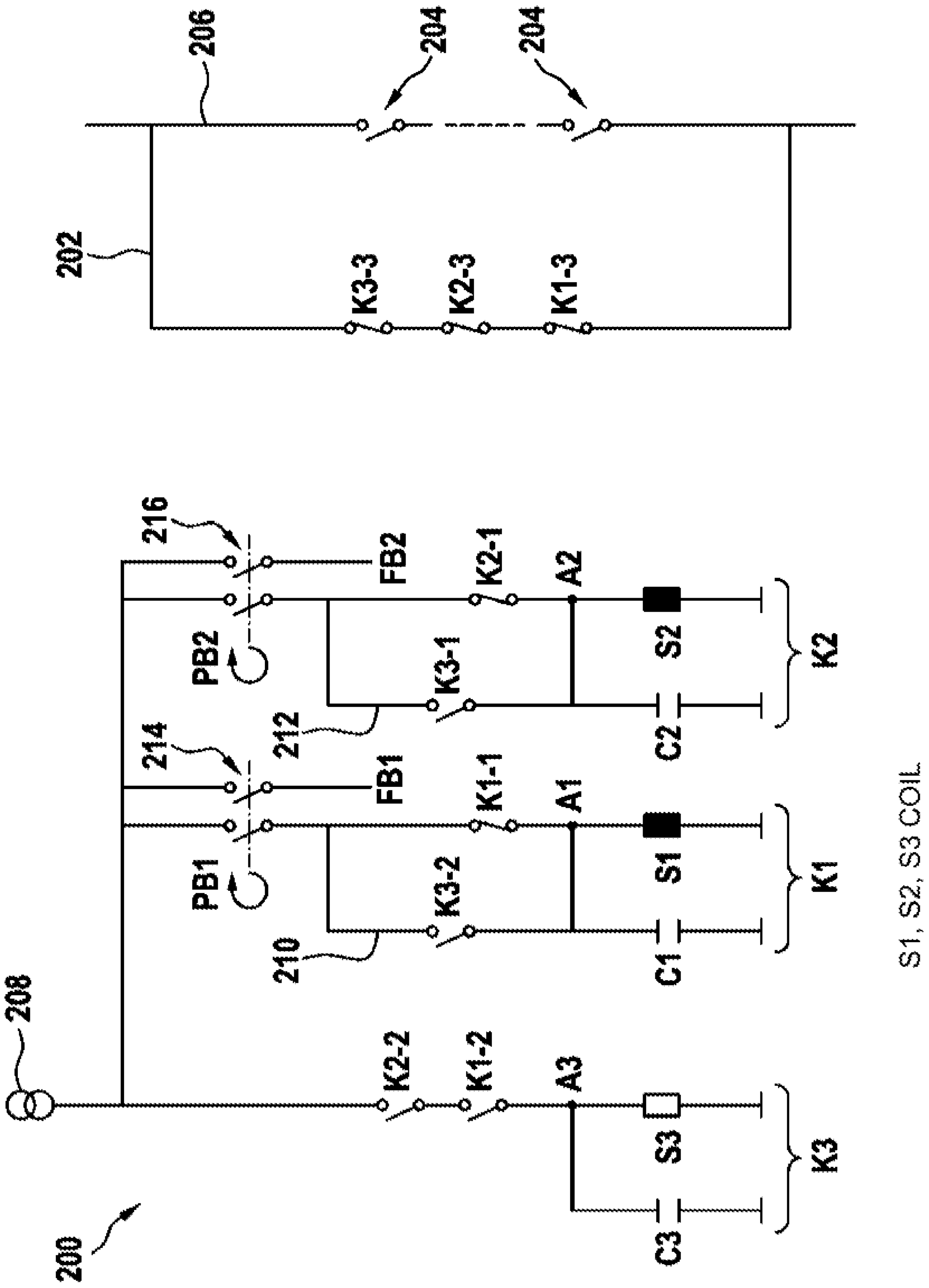
FIG. 7 shows the control device from FIG. 1 when the first operating element and the second operating element have been released.

If the two operating elements PB1, PB2 are now released again, as shown in FIG. 7, the two coil terminals A1, A2 are each disconnected from the energy source 208, but continue to be temporarily supplied with power via each of the capacitors C1, C2.

The two coils S1, S2 only drop out so that the contacts K1-1, K1-3, K2-1, K2-3 are opened again and the contacts K1-2, K2-2 are closed again when the two capacitors C1, C2 are discharged. Accordingly, the third coil terminal A3 is also now supplied with power so that the third capacitor C3 is charged again and the third coil S3 is energized again. The control device 200 is thus again in the switching state shown in FIG. 3.

The switching arrangement of the control device 200 shown in FIGS. 2 to 7 makes it possible for the elevator control means to be informed directly via the first feedback path FB1 or the second feedback path FB2 about the release of the first operating element PB1 or the second operating element PB2, but the safety circuit 206 is opened with a delay due to a response time of the first switching unit K1 or the second switching unit K2, with the response time depending on a capacitance of the first capacitor C1 or the second capacitor C2. Thus, by appropriately actuating the power converter 106, the elevator control means can bring about a controlled stop of the elevator car 102 at an early stage before the braking device 108 is activated in response to the interruption of the safety circuit 206.

Figure 8:
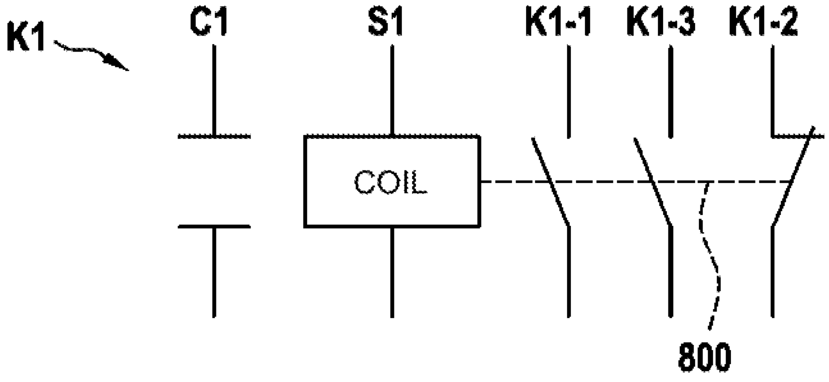
FIG. 8 shows an example of an embodiment of a first switching unit of the control device from FIG. 1.

By way of example, FIG. 8 shows an embodiment of the first switching unit K1 as a relay in the rest position. This shows at a glance which of the contacts acts as an NO contact and which acts as an NC contact. The first coil S1, the first capacitor C1 which is connected in parallel with the first coil, an armature 800 (here, by way of example, a tie rod) which can be moved electromagnetically between the rest position and an actuated position by means of the coil S1, and the three contacts K1-1, K1-2, K1-3, each of which is mechanically coupled to and therefore forcibly guided by the armature 800, are shown.

Figure 9:
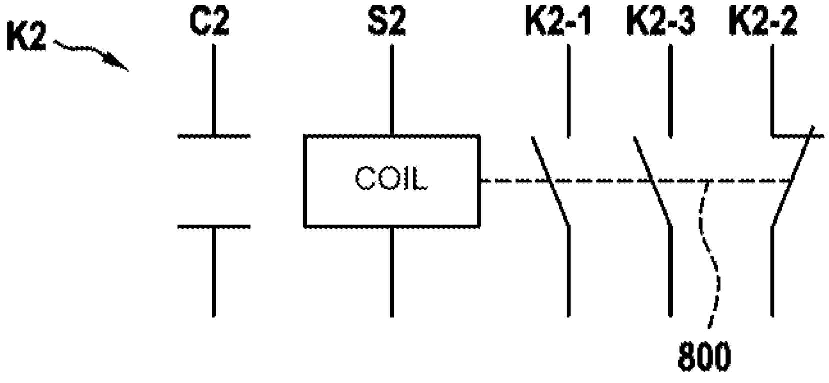
FIG. 9 shows an example of an embodiment of a second switching unit of the control device from FIG. 1.

By way of example, FIG. 9 schematically shows an embodiment of the second switching unit K2 as a relay in the rest position.

Figure 10:
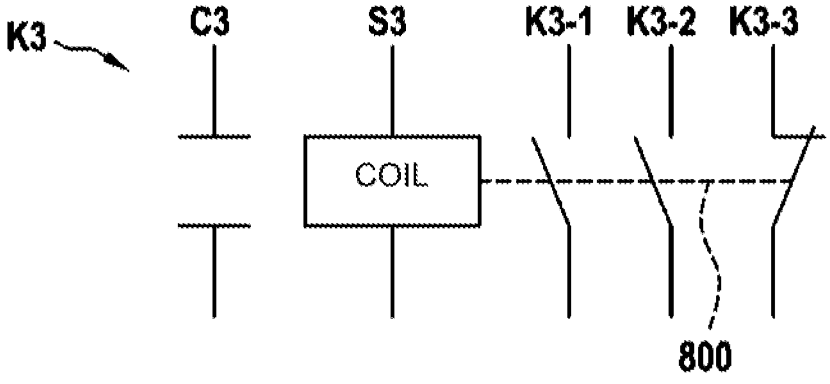
FIG. 10 shows an example of an embodiment of a third switching unit of the control device from FIG. 1.

By way of example, FIG. 10 schematically shows an embodiment of the third switching unit K3 as a relay in the rest position.

The switching units K2, K3 are each designed analogously to the first switching unit K1.

Finally, it should be noted that terms such as "comprising," "including," etc. do not preclude other elements or steps, and terms such as "a" or "an" do not preclude a plurality. Furthermore, it should be noted that features or steps that have been described with reference to one of the above embodiments may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A control device for controlling an elevator system in inspection mode, the elevator system having a safety circuit with at least one safety contact that is open in the inspection mode, and an inspection path for bridging the at least one safety contact, the control device comprising:

a first operating element for operating the elevator system in the inspection mode;

a second operating element for operating the elevator system in the inspection mode;

a first switching unit having a first contact and a first delay means, the first switching unit closing the first contact in response to an actuation of the first operating element and opening the first contact in response to a release of the first operating element;

wherein the first delay means delays the opening of the first contact by a predetermined first delay time after the release of the first operating element;

a second switching unit connected in parallel with the first switching unit, the second switching unit having a second contact and a second delay means, the second switching unit closing the second contact in response to an actuation of the second operating element and opening the second contact in response to a release of the second operating element;

wherein the second delay means delays the opening of the second contact by a predetermined second delay time after the release of the second operating element; and wherein the first contact and the second contact are connected in series in the inspection path of the elevator system.

2. The control device according to claim 1 wherein the elevator system has an elevator car, a drive driving the one elevator car, a power converter controlling a power supply of the drive and a braking device braking the elevator car, wherein the braking device is activated to brake the elevator car by interrupting the safety circuit, wherein the first delay time and the second delay time selected such that the elevator car is stopped by controlling the power supply to the drive before the braking device is activated when the safety circuit is interrupted.

3. The control device according to claim 1 wherein the first delay time and the second delay time are each greater than 10 ms.

4. The control device according to claim 1 including a third switching unit connected in parallel with the first switching unit and the second switching unit, the third switching unit having a third contact and a third delay means, the third switching unit closing the third contact in response to the actuation of the first operating element and/or the actuation of the second operating element and opening the third contact in response to the release of the first operating element and the second operating element, wherein the third delay means delays the closing of the third contact by a predetermined third delay time after the actuation of the first operating element and/or actuation of the second operating element, and wherein the third contact is connected in series with the first contact and the second contact in the inspection path of the elevator system.

5. The control device according to claim 4 wherein the third switching unit prevents at least one of the first, second and third contacts in the inspection path from closing when there is a fault in the third switching unit.

6. The control device according to claim 1 wherein the first switching unit includes a first control terminal, the first switching unit closing the first contact when a control signal is present at the first control terminal and opening the first contact when the control signal is not present at the first control terminal, wherein the first operating element in an actuated position connects the first control terminal to a signal source to generate the control signal and in a rest position disconnects the first control terminal from the signal source, and wherein the first delay means delays a drop-out of the control signal at the first control terminal by the first delay time after the first control terminal is disconnected from the signal source.

7. The control device according to claim 1 wherein the second switching unit includes a second control terminal, the second switching unit closing the second contact when a control signal is present at the second control terminal and opening the second contact when the control signal is not present at the second control terminal, wherein the second operating element in an actuated position connects the second control terminal to a signal source for generate the control signal and in a rest position disconnects the second control terminal from the signal source, and wherein the second delay means delays a drop-out of the control signal at the second control terminal by the second delay time after the second control terminal is disconnected from the signal source.

8. The control device according to claim 1 including:

wherein the first switching unit includes a first control terminal, the first switching unit closing the first contact when a control signal is present at the first control terminal and opening the first contact when the control signal is not present at the first control terminal, wherein the first operating element in an actuated position connects the first control terminal to a signal source to generate the control signal and in a rest position disconnects the first control terminal from the signal source, and wherein the first delay means delays a drop-out of the control signal at the first control terminal by the first delay time after the first control terminal is disconnected from the signal source;

wherein the second switching unit includes a second control terminal, the second switching unit closing the second contact when the control signal is present at the second control terminal and opening the second contact when the control signal is not present at the second control terminal, wherein the second operating element in an actuated position connects the second control terminal to the signal source for generate the control signal and in a rest position disconnects the second control terminal from the signal source, and wherein the second delay means delays a drop-out of the control signal at the second control terminal by the second delay time after the second control terminal is disconnected from the signal source;

a third switching unit connected in parallel with the first switching unit and the second switching unit, the third switching unit including a third contact and a third delay means, the third switching unit closing the third contact in response to the actuation of the first operating element and/or the actuation of the second operating element and opening the third contact in response to the release of the first operating element and the second operating element, wherein the third delay means delays the closing of the third contact by a predetermined third delay time after the actuation of the first operating element and/or actuation of the second operating element, and wherein the third contact is connected in series with the first contact and the second contact in the inspection path of the elevator system;

wherein the first switching unit includes a fourth contact, the first switching unit opening the fourth contact when the control signal is present at the first control terminal and closing the fourth contact when the control signal is not present at the first control terminal;

wherein the second switching unit includes a fifth contact, the second switching unit opening the fifth contact when the control signal is present at the second control terminal and closing the fifth contact when the control signal is not present at the second control terminal;

wherein the third switching unit includes a third control terminal, the third switching unit opening the third contact when the control signal is present at the third control terminal and closing the third contact when the control signal is not present at the third control terminal;

wherein the third delay means delays a drop-out of the control signal at the third control terminal by the third delay time after the third control terminal is disconnected from the signal source;

wherein the third control terminal is connected to the signal source by the fourth contact and the fifth contact; and wherein the fourth contact and the fifth contact are connected in series.

9. The control device according to claim 8 wherein the third switching unit prevents at least one of the first, second and third contacts in the inspection path from closing when there is a fault in the third switching unit.

10. The control device according to claim 8 wherein the first switching unit includes a sixth contact, the first switching unit closing the sixth contact when the control signal is present at the first control terminal and opening the sixth contact when the control signal is not present at the first control terminal, wherein the third switching unit has a seventh contact, the third switching unit closing the seventh contact when the control signal is present at the third control terminal and opening the seventh contact when the control signal is not present at the third control terminal, wherein the sixth contact is connected between the first operating element and the first control terminal, and wherein the seventh contact is arranged in a bridging path that bridges the sixth contact.

11. The control device according to claim 10 wherein the second switching unit includes an eighth contact, the second switching unit closing the eighth contact when the control signal is present at the second control terminal and opening the eighth contact when the control signal is not present at the second control terminal, wherein the third switching unit includes a ninth contact, the third switching unit closing the ninth contact when the control signal is present at the third control terminal and opening the ninth contact when the control signal is not present at the third control terminal, wherein the eighth contact is connected between the second operating element and the second control terminal, and wherein the ninth contact is arranged in another bridging path that bridges the eighth contact.

12. The control device according to claim 8 wherein at least one of the first switching unit, the second switching unit and the third switching unit includes an electromechanical relay.

13. The control device according to claim 12 including at least one of:

the first delay means including a capacitor connected in parallel with a coil of the first switching unit relay;

the second delay means including a capacitor connected in parallel with a coil of the second switching unit relay; and the third delay means including a capacitor connected in parallel with a coil of the third switching unit relay.

14. An elevator system comprising:

a safety circuit having at least one safety contact that is open in an inspection mode of the elevator system;

an inspection path bridging the at least one safety contact; and the control device according to claim 1 for controlling the elevator system in the inspection mode.

* * * * *